US006327259B1

(12) United States Patent
Chiu et al.

(10) Patent No.: US 6,327,259 B1
(45) Date of Patent: Dec. 4, 2001

(54) FLEXIBLE PLACEMENT OF SERIAL DATA WITHIN A TIME DIVISIONED MULTIPLEXED FRAME THROUGH PROGRAMMABLE TIME SLOT START AND STOP BIT POSITIONS

(75) Inventors: Kenny Kok-Hoong Chiu, Singapore (SG); Eric G. Chambers; Patrick E. Maupin, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/088,788

(22) Filed: Jun. 1, 1998

(51) Int. Cl.[7] ........................................ H04J 3/00
(52) U.S. Cl. ............................................. 370/375
(58) Field of Search ........................ 370/375, 465, 370/466, 351, 352, 441, 350, 503, 347, 337, 376, 372, 370, 369, 367, 364, 442, 522, 524, 389, 387, 388, 378

(56) References Cited

PUBLICATIONS

MC68302 Integrated Multiprotocol Processor User's Manual; Motorola, 1995, cover pages, table of contents, and pp. 4–16 through 4–19, and E17 through E19.

ITU–T Telecommunication Standardization Sector of ITU, International Telecommunication Union, 1988, 1993, cover pages and pp. 1–3.

Reference Data Sheet, T7237 ISDN U–Interface Transceiver, AT&T Microelectronics, Mar. 1996, pp. 49–52.

Using the Am186™ES and AM188™ES Microcontrollers in Communications Applications, Advanced Micro Devices, Inc., Apr. 2, 1997.

AM186™EM and AM188™EM Microcontrollers User's Manual, Advanced Micro Devices, Inc., pp. i through viii, 9–1 through 9–13, and 11–1 through 11–8.

*Primary Examiner*—Dang Ton
(74) *Attorney, Agent, or Firm*—Akin, Gump, Strauss, Hauer & Feld, L.L.P.

(57) ABSTRACT

A microcontroller is provided with one or more synchronous serial channels, such as HDLC channels, that are coupled to time slot assigners for communication over a time division multiplex bus. The time slot assigners each include a bit position start register and a bit position stop register that allows the time slot assigner to enable and disable the associated synchronous serial channel on the arrival of a specific bit position within the time division multiplex bus frame. Further, an end of slot adjust register provides for additional bits to be placed by the time slot assigner on to the end of a slot that is transmitted by an associated synchronous serial communication channel transmitter.

30 Claims, 11 Drawing Sheets

FLEXIBLE PLACEMENT OF SERIAL DATA WITHIN A TIME DIVISIONED MULTIPLEXED FRAME THROUGH PROGRAMMABLE TIME SLOT START AND STOP BIT POSITIONS

BACKGROUND OF THE INVENTION

1. Field of the Invention

The invention relates to microcontrollers, and more specifically, to a microcontroller having an improved interface for a time division multiplexed bus.

2. Description of the Related Art

Specialized microcontrollers with integrated communication features are becoming particularly attractive for communications applications. A microcontroller, or an embedded controller, is uniquely suited to combining functionality onto one monolithic semiconductor substrate (i.e. chip). By embedding various communication features within a single chip, a communications microcontroller may support a wide range of communication applications.

Microcontrollers have been used for many years in many applications. A number of these applications involve communications over electronic networks, such as telephone lines, computer networks, and local and wide area networks, in both digital and analog formats. In communications applications, a microcontroller generally has a number of integrated communications peripherals in addition to the execution unit. These can be low and high speed serial ports, as well as more sophisticated communications peripherals, such as a universal serial bus (USB) interface, and high level data link control (HDLC) channels.

For high speed communications that use frames of data, HDLC channels are especially well suited. An HDLC channel transmits and receives frames based on the HDLC format. This format uses flags to determine the start and stop of a frame, and uses "bit stuffing" to maintain data transparency. An HDLC channel, however, is a general purpose device, and can be employed to implement a number of communications protocols, such as the serial circuit interface (GCI) protocol (similar to an IOM-2 protocol) sometimes used for ISDN (integrated services digital network) communications (similar to the IOM-2 protocol), a pulse coded modulation (PCM) highway protocol, as well as raw data communications equipment (DCE) formats. These formats are synchronous communication protocols that may or may not include a separate clock.

But communications employing the HDLC format can be further implemented within time slots of a lower level time division multiplexed framing protocol, such as a T1 or E1 protocol. This protocol employs 24 or 32 time slots of 8 bits each, and each time slot could be used to carry different communications data, even in different formats. In such protocols, the time slots are determined based on a frame sync signal, which can be embedded in the data stream, be embedded in a clock stream, or even a separate signal, depending on the communications protocol. Each such time slot, for example, could be implemented to carry a separate HDLC channel of data.

Further, a time slot assigner (TSA) can be coupled in a microcontroller to an HDLC channel for slot-level placement of the HDLC data on the external communication path. Such a TSA determines the start of a programmed time slot relative to the frame sync. This could be to provide the HDLC data within a particular time slot, or to further implement some sort of protocol that employs its own time slots, such as the protocol used for ISDN. In the GCI protocol, a frame is subdivided into two 8-bit B channels and a 2-bit D channel, which form two separate 8-bit and one 2-bit "slot" within a communications frame on the GCI bus.

More generally, a time slot assigner (TSA) typically supports the isolation of 8-bit slots from 0 to 155 on a standard 8 kilohertz time division multiplexed (TDM) frame. This supports a variety of TDM buses, including GCI, E1, T1, PCM highway, and others. Of course, other length frames, other speeds, and other numbers of slots can be supported as well.

SUMMARY OF THE INVENTION

According to the invention, a time slot assigner is coupled to a synchronous serial communication channel in a microcontroller, and starts and stops the clock to the serial communications channel for the serial communications channel to send and receive in its appropriate time slot on a TDM data bus. According to the invention, however, the time slot assigner is programmable to select a time slot on a TDM bus at the bit level. That is, the time slot assigner enables the serial channel at the start of a particular bit position within a frame on the TDM bus, and then stops the serial communications channel at a particular bit position on the TDM bus. According to one embodiment, the serial communications is an HDLC channel which can provide for a variety of formats on the TDM bus.

Further according to the invention, the time slot assigner can be programmed to provide 1 to 7 additional bits of data at a predetermined level after the time slot. This allows for 1 to 7 additional bits of data to be provided to "pad" a time slot with predetermined data. This is useful where the serial communications channel uses less than the entire time slot, but the remainder of the time slot must include data set to a predetermined value.

DETAILED DESCRIPTION OF INVENTION

RELATED APPLICATIONS

The following application is incorporated by reference:

U.S. patent application entitled BYTE ALIGNMENT OF DATA ON TIME DIVISION MULTIPLEXED BUS, filed Jun. 1, 1998, U.S. application Ser. No. 09/088,132, by Wade L. Williams.

Figure 1A:
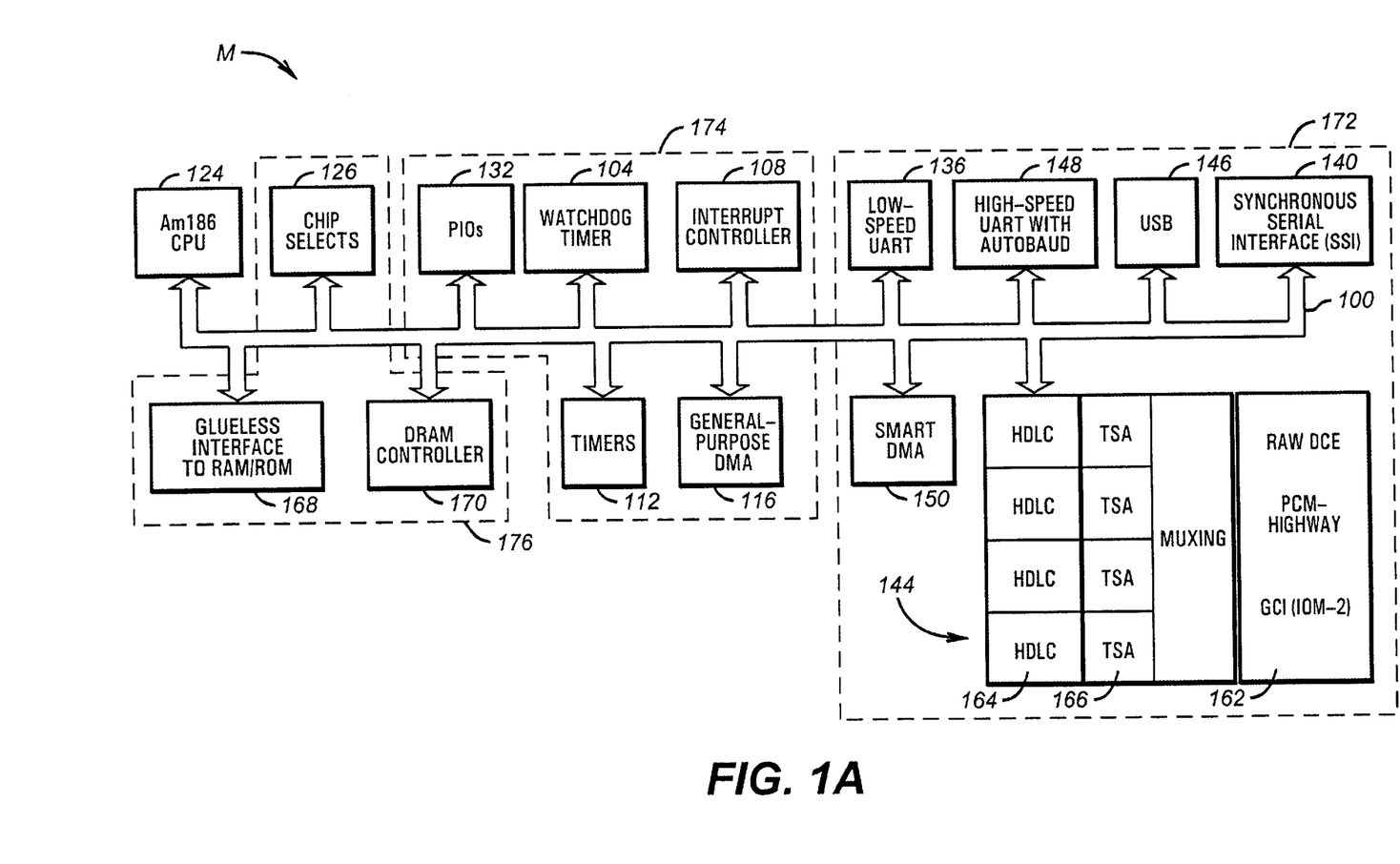
FIG. 1A is a block diagram of a typical microcontroller implemented according to the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176 and serial communication peripherals 172. The execution unit 124 in the disclosed embodiment is compatible with the AM186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three channel timer control unit 112. The timer control unit 112 includes three 16-bit programmable timers. Another system peripheral is a general purpose direct memory access (DMA) unit 116 with four channels 0–3. A programmable I/O unit 132 of the microcontroller M supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. Also in the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well suited to communications environments. To this end, the serial communication peripherals 172 of the microcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "Smart-DMA" unit 150, a unit which provides for chained buffers that are accessed via pairs of DMA channels. The Smart-DMA unit 150 allows for a high degree of packetized transfer without excessive execution unit 124 intervention. The SmartDMA unit 150 preferably consists of four SmartDMA controllers, SmartDMA0–3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. It should be understood that the microcontroller M may include multiple HSUARTs 148.

The disclosed HDLC controller 144 also includes an interface multiplexer 162. This multiplexer 162 couples the four HDLC channels 164, four time slot assigners (TSA) 166, and a number of external buses. Specifically, using the time slot assigners or otherwise, the HDLC channels 164 can be selectively coupled to a pulse code modulation (PCM) highway, a general circuit interface (GCI), a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assigner 166 for assigning a portion of a serial frame to each HDLC for isochronous communication.

Figure 1B:
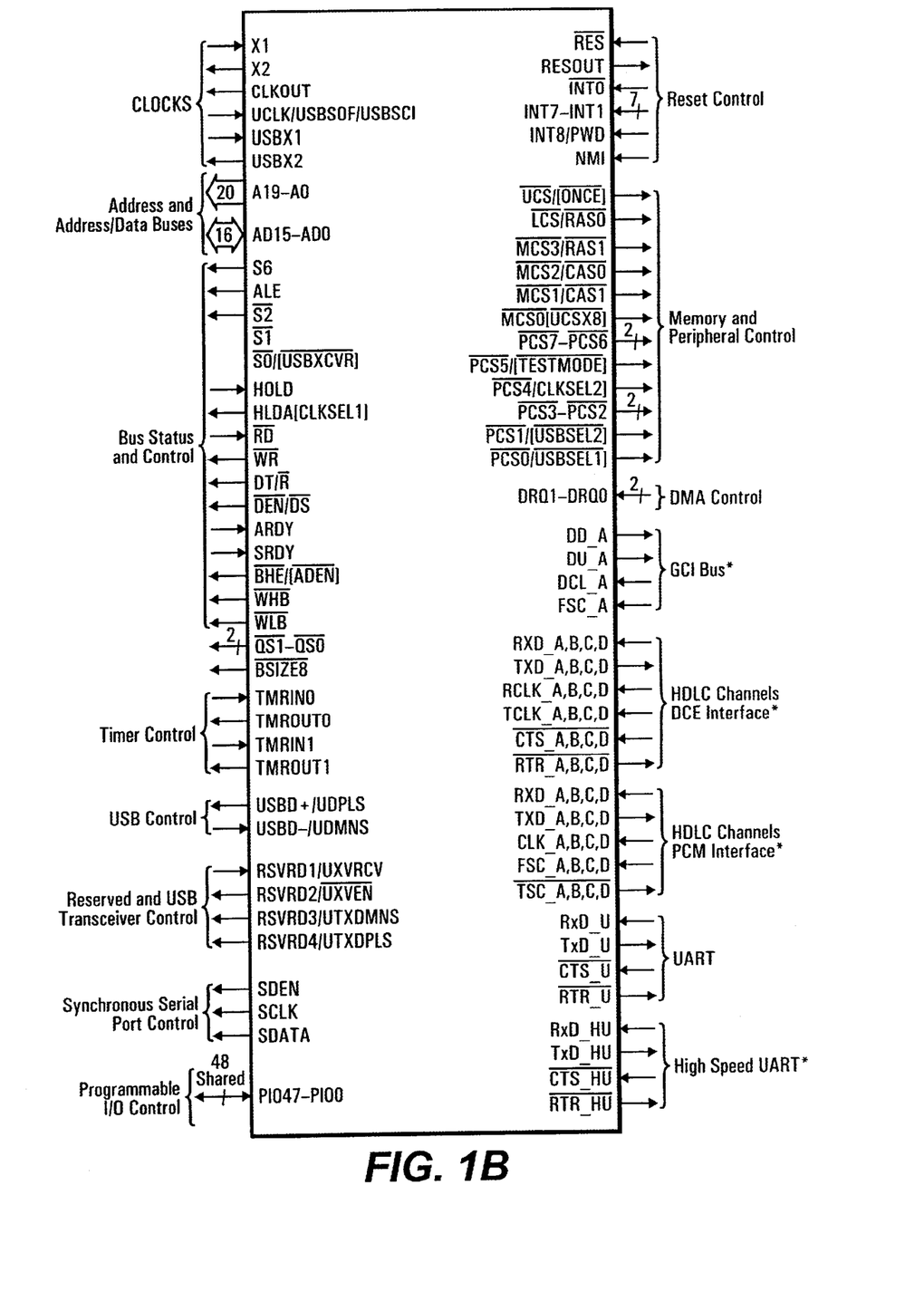
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general purpose peripherals from FIG. 1A could be eliminated, or added to, without detracting from the spirit of the invention.

The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
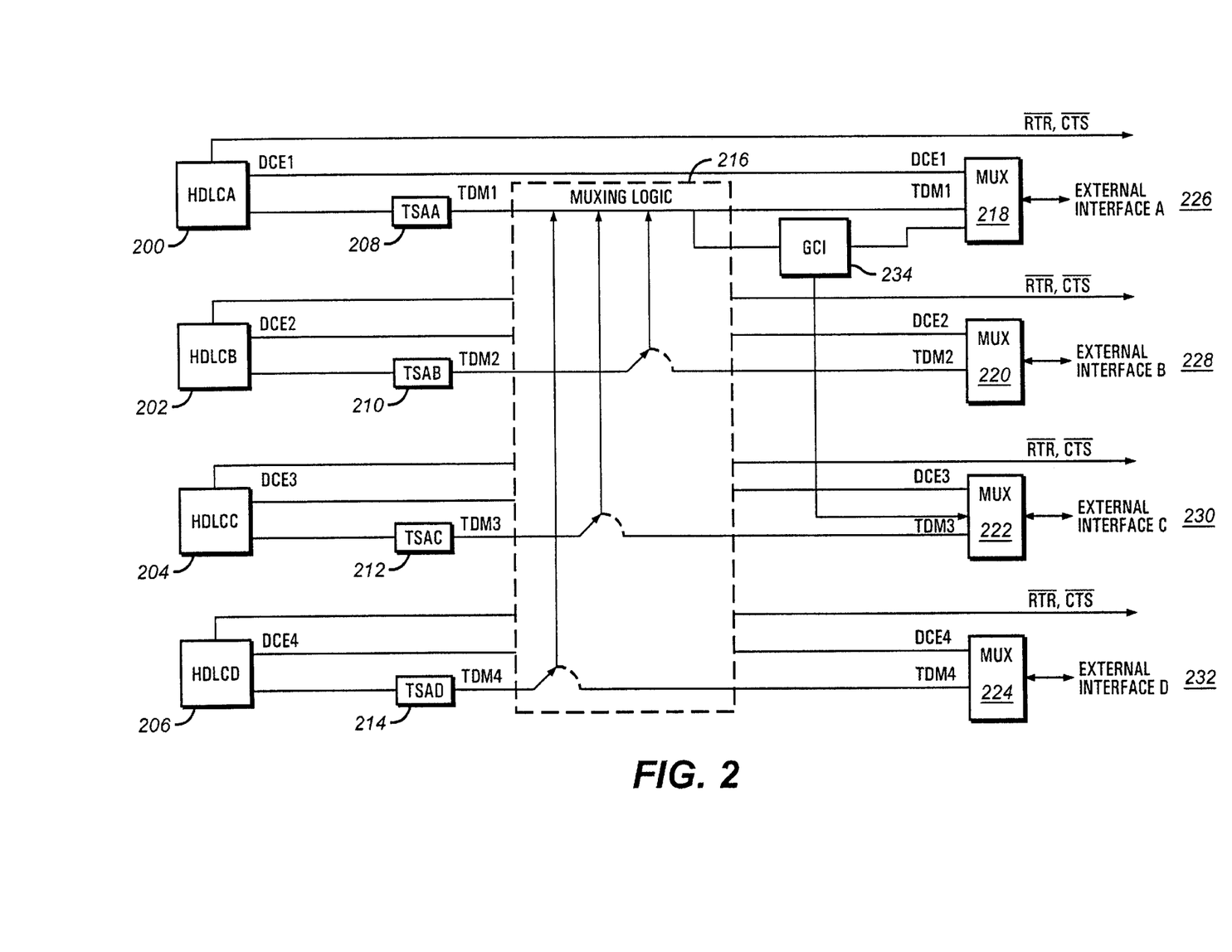
FIG. 2 is a block diagram illustrating four HDLC channels coupled to four time slot assigners and then multiplexed onto a single bus.

Turning to FIG. 2, shown is a simplified block diagram of the HDLC channels 164 interfaced to the TSAs 166 and multiplexing logic 166. Specifically, four HDLC channels HDLCA 200, HDLCB 202, HDLCC 204, and HDLCD 206 are each selectively coupled to a TSAA 208, TSA B210, TSA C212, and TSA D214. Multiplexing logic 216 then selectively couples those TSAs 208–214 to a variety of interfaces, including four multiplexers 218, 220, 222, and 224 that in turn couple to four external interfaces 226, 228, 230, and 232. Alternatively, the HDLC channels 200–206 can be directly coupled to the external interfaces 226–232 for a raw data communications equipment (DCE) communications mode. Further, a general circuit interface (GCI) 234 can be coupled to the HDLCA 200 via the interface 226 for data transfer and the interface 230 for clock/frame sync.

For illustrative purposes, however, the remainder of this discussion focuses on a time division multiplexed (TDM) bus coupled to the external interface A 226. In addition, the HDLCA channel 200, the HDLCB channel 202 and HDLCC channel 204 are all coupled to that external interface A 226 for communication over the same external TDM bus. The HDLCD channel 206 is shown coupled to a PCM highway.

Figure 3:
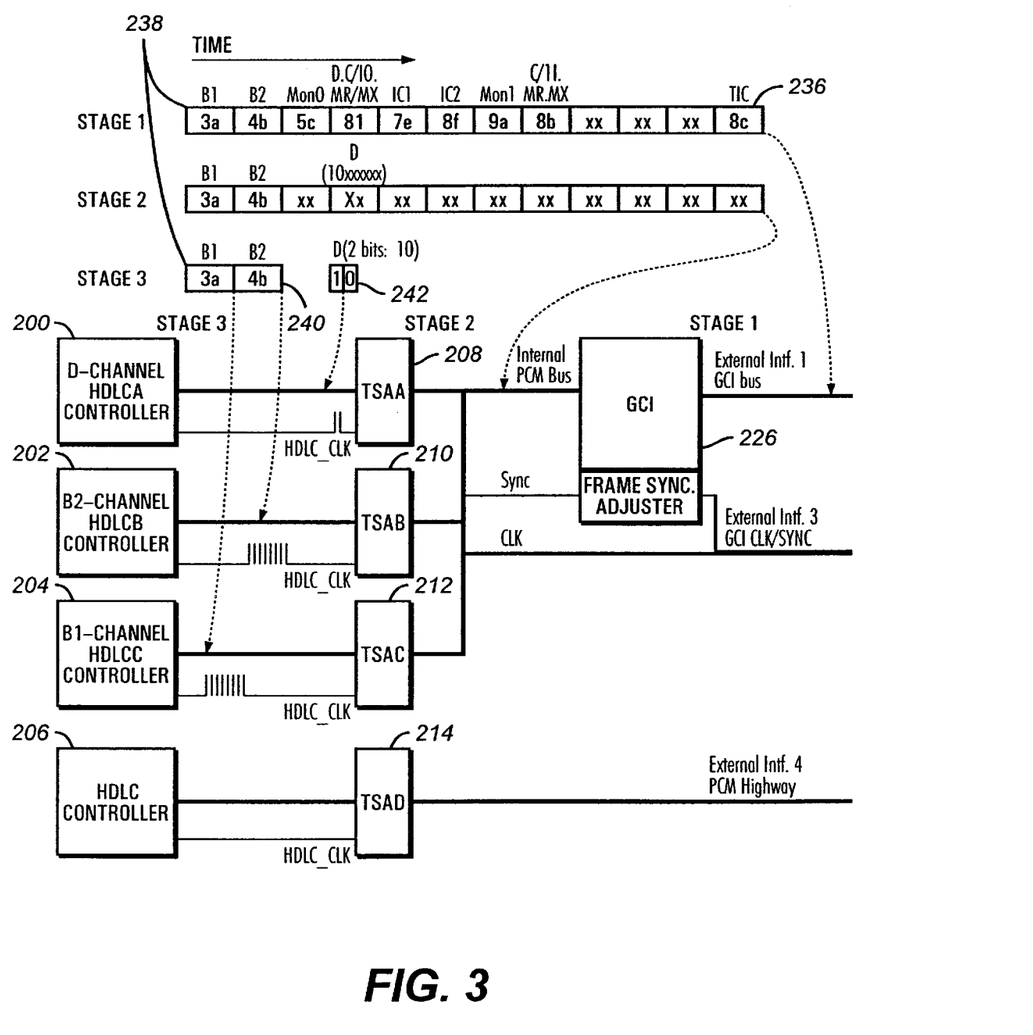
FIG. 3 is a block diagram illustrating the use of bit level time slot assigners in conjunction with the HDLC channels of FIG. 2 on a GCI bus for transmitting or receiving ISDN data.

This is further illustrated in FIG. 3. FIG. 3 shows one configuration of the HDLC channels 164 and TSA's 166. In this configuration, the use of the TSAs 208–212 to couple the HDLC channels 200–204 is shown for a typical ISDN implementation. For ISDN over a GCI bus, data is communicated over two B channels and one D channel. In a particular frame, each B channel has 8 bits and the D channel has 2 bits.

According to the invention, however, the HDLC channels 200–204 do not keep track of the current bit position within an illustrated GCI frame 236. Instead, the TSAs 208–212 keep track of the start of each frame, such as the frame 236, and then count bit positions within the frame at which to start a clock to the corresponding HDLCA channel 200–204 and then to stop that clock. In FIG. 3, the HDLCA channel 200 is shown as providing data over the D channel, whereas the HDLCB channel 202 and HDLCC channel 204 respectively provide a received data over the second and first B channels.

In particular, TSAC 212, for example, is set up such that on the first bit position of the frame 236, it enables the clock to the HDLCC channel 204 for 8 bit positions, so that the HDLCC channel 204 then either clocks in or clocks out (depending on whether it is receiving or sending) data for the first B channel 238 within the frame. Similarly, the TSAB 210 is set up to enable the clock to the HDLCB channel 202 on the 8th bit position through the 15th bit position of the frame 236. This corresponds to the data for the second B channel 240 of the frame 236.

Thus, the TSAC 212 couples the HDLCC channel 204 to the external interface A 226 for the first 8 bit positions of the frame 236, the TSAB 210 couples the second HDLCB channel 202 to the external interface 226 for the second byte of the frame 236.

The HDLCA channel 200, however, is only to provide 2 bits of data for the D channel 242. So, the TSAA 208 detects a 24th bit position within the frame 236 and enables the clock to the HDLCA channel 200, and then detects a 26th bit position of the frame 236 where it disables the HDLCA channel 200.

This illustrates a number of features according to the invention. First, by providing a separate TSA 208–214 for each of the HDLC controllers 200–206, one can isolate the transmission and reception of data on particular time slots within a frame independently of the other channels. Second, by providing bit, rather than byte, level starting and stopping of the HDLC controllers 200–204, time slots having less than 8 bits of data and located at particular locations within bytes within a frame are easily accommodated. These various modes are configured via registers accessed by the execution unit 124 over the bus 100, and are further discussed below in conjunction with their associated circuitry.

Figure 4:
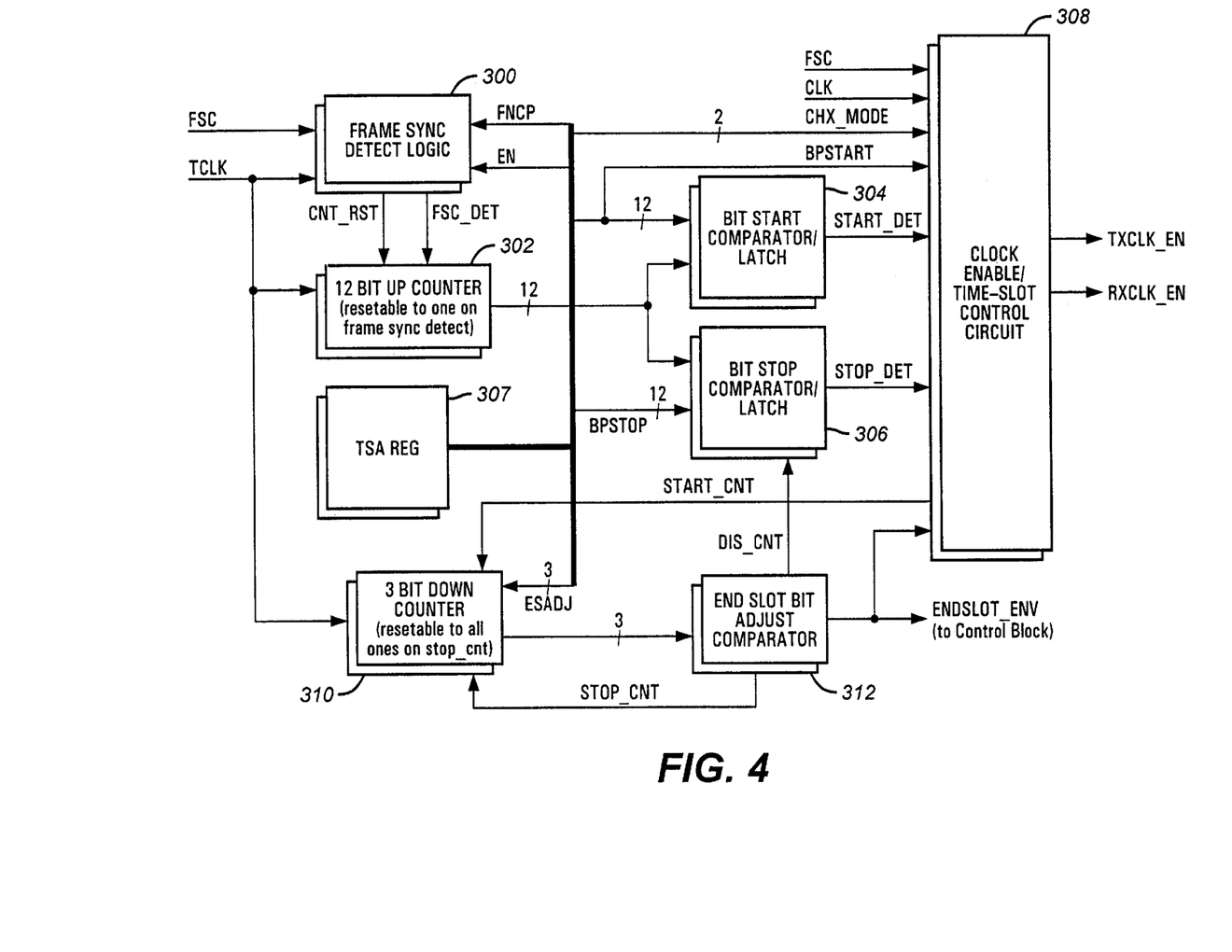
FIG. 4 is a block diagram of circuitry in a time slot assigner to implement bit level start and stop of an HDLC channel and end-of-slot adjustment.

Turning to FIG. 4, illustrated is the time slot generator associated with each of the TSAs 208–214. This generator includes a number of logical blocks that generate appropriate clock enables to the associated HDLC channel 200–206. In FIG. 4, a frame sync detect block 300 accepts a frame signal and clock signal, here shown as the signals FSC and TCLK, from the external interface 226. The logic in the block 300 monitors for the occurrence of a frame sync pulse, sampling it at the falling edge of the clock signal TCLK, and generates a frame sync detect latched enable signal, FSC_DET to start an up counter (here a 12 bit up counter) 302. This counter, also clocked by TCLK from the start of a frame, is implemented as a synchronous N bit counter which is resettable upon subsequent FSC_DET pulses. This counter thus counts the number of clock pulses on the clock signal TCLK, and thus counts the bit positions within a current frame whose start was detected by the frame sync detect logic 300.

Two registers (BPSTART and BPSTOP) contained in the TSA register 307 have been programmed by the execution unit 124 with the start bit and the stop bit positions for the TSAA 208 to enable and disable the HDLCA channel 200. When the current count of the 12-bit up counter 302 equals a bit start register BPSTART, the bit start comparator/latch 304 provides a latched start detect signal START_DET to a clock enable/time slot control circuit 308. Similarly, when a stop bit position value BPSTOP within the stop register loaded is reached by the 12-bit up counter 302, the bit stop comparator/latch 306 resets the START_DET signal and generates a stop detect signal STOP_DET that is provided true to the clock enable/time slot control circuit 308.

The clock enable/time slot control circuit 308 generates the HDLCA channel 200 transmit and receive clock enables TXCLK_EN and RXCLK_EN. When these signals are true to the HDLCA channel 200, the HDLCA channel 200 can transmit or receive data based on TCLK. For example, referring back to FIG. 3, the TSAA 208 would provide TXCLK_EN and RXCLK_EN as true from bit position 24–25 of the frame 236 onto the HDLCA channel 200. Software running on the execution unit 124 would select whether the HDLCA channel 200 should be transmitting or receiving at a particular instance.

If BPSTART is loaded with a value that is greater than BPSTOP, this would cause frame boundaries to be crossed. This is allowed for implementations in which this would be desirable. If BPSTART and BPSTOP are the same, only a single bit position corresponding to this value would be sent or received.

Even after the end bit position has been reached as reflected by BPSTOP, it may be desirable to continue to drive a predetermined number of bits onto a frame, such as the frame 236. For example, in certain implementations, it is impermissible to always drive all of the bits of the B channels such as the B channel slots 238 and 240. In such an instance, it may be desirable to drive 7 bits of data from one of the HDLC channels 200–206, and then to drive the 8th bit to a predetermined value, but transparently to the HDLC channels 200–206.

To this end, a 3-bit down counter 310 is provided which is triggered by the STOP_DET signal. When triggered, it counts down and is compared to an end slot bit adjust comparator 312, which provides an ENDSLOT_ENV control signal to the clock enable/time slot control circuit 308. This value stays high until the 3-bit down counter 310 matches the end slot adjust comparator 312.

While the ENDSLOT_ENV signal is high, the clock enable/time slot control circuit 308 does not leave the TXCLK_EN and RXCLK_EN signals enabled, but does provide predetermined data to the external bus 226. This data is selected via a register within the TSA registers 307 by setting a drive level bit DRVLVL either high to provide these end of slot adjust bits at a high level, or low to provide the end of slot adjust bits at a low level.

Thus, by providing multiple HDLC channels to communicate over a single external bus via individually assigned TSAs, and by providing bit level controlability of the enablement of the HDLC controllers, implementation of the system is greatly simplified. The programmability of the start and stop bits with respect to a time division multiplexed frame allows for data of any width to be placed anywhere within (or across) the time division multiplexed frame, subject to the physical limit imposed by the size of the BPSTART and BPSTOP registers. This is compared to prior systems which have operated on 8-bit fixed fields, or required external signals for control. Further, masking fields are not needed to communicate over slots that have less than 8 bits.

Another advantage to the bit level controlability illustrated in FIG. 4 relates to the scalability of frame size. Larger frames can easily be handled by the TSA of FIG. 4 simply by scaling up the size of the counter 302 and the comparators 304 and 306. Although they are shown as 12-bit values, to provide for additional frame length, and correspondingly later start and stop bit positions BPSTART and BPSTOP, the designer simply adds bits to that counter and the comparators. This provides for seamless scalability.

This can be used in a number of applications. For example, more than one of the HDLC channels 200–206 could be multiplexed onto a single B channel, according to a V.110 protocol that requires certain low data rate data to be converted to intermediate subdata rates and placed at a specific location within an ISDN B channel. Also, as illustrated above, a separate HDLC controller can independently communicate over the 2-bit D channel 242 illustrated in FIG. 3 for signaling information. Further, transparent HDLC data could be overlayed onto the IC channel of the general circuit interface (GCI) frame. All of these examples are facilitated by the employment of bit specific start and stop locations within a time division multiplexed frame.

Figure 5:
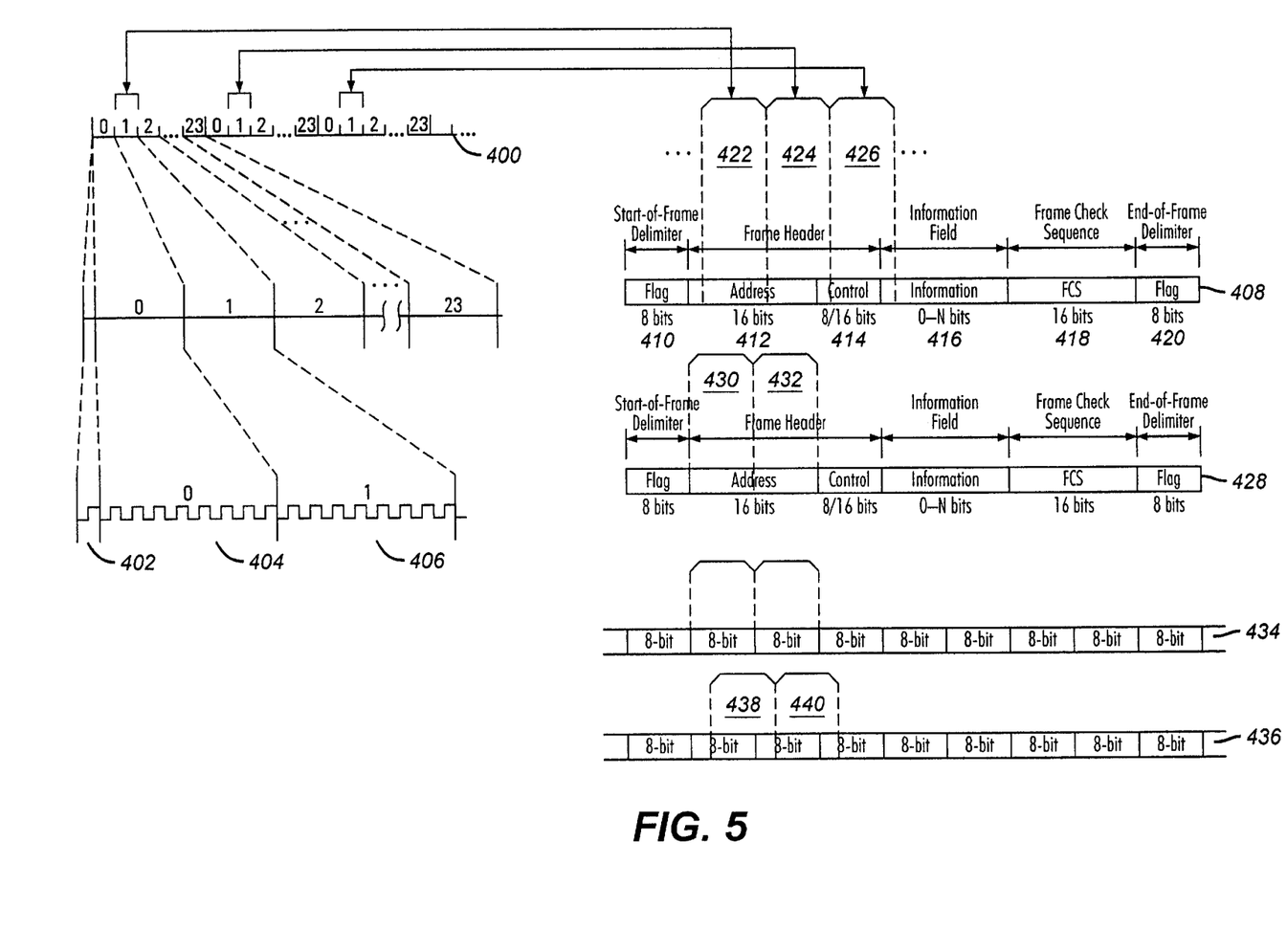
FIG. 5 is a timing diagram illustrating the alignment or lack of alignment of serial data within slots of a time division multiplexed bus.

Turning to FIG. 5, illustrated is another feature and application of the HDLC channels 164 and TSAs 166 according to the invention. FIG. 5 shows a series of T1 frames 400 that can be carried on the external interface A 226 of FIG. 2. A T1 frame consists of a frame bit 402 followed by 24 8-bit slots (32 8-bit slots for E1). Particularly shown are slots 0 404 and 1 406, which are seen to contain 8 clocked bits.

But each slot of the T1 frame 400 can carry its own, independent data channel. If one of the HDLC channels 164 is assigned to that slot, and its associated TSA 166 enables it only during that slot, to the HDLC channel, such as the HDLCA 200, the slot assignment is transparent, because the HDLCA channel 200 is only enabled by the TSAA 208 during slot 1 406, for example, of the T1 frame 400. That is, to the HDLC channel, communications appears to be continuous because the TSA externally controls the clock to the HDLC channel.

A standard HDLC frame, however, employs 8-bit framing flags to indicate the start and end of a frame. Such a frame is illustrated as the frame 408. This flag sequence is generally 8'b01111110. Such a flag is transmitted as a start of frame delimiter 410, followed by a 16-bit address 412 and 8 to 16 bits of control 414. An information field 416 then follows, followed by a frame check sequence, or CRC sequence, 418. This is followed by an end of frame delimiter 420.

An HDLC frame avoids the occurrence of a start of frame flag within the body of the frame by using bit stuffing and bit unstuffing. Specifically, after five contiguous 1s, a 0 is inserted. On the received end, a 0s after five contiguous 1s is deleted.

Assume the HDLCA channel 200 is sending or receiving the frame 408. It will be appreciated that how that frame is divided among consecutive slot 1s in the T1 frame 400 is inconsequential. Here, three consecutive slot 1s 422, 424, and 426 are shown being mapped from the HDLC frame 408 to slot 1 of the T1 frames 400. Although they are not byte aligned, this does not matter. Because the HDLCA channel 200 aligns its HDLC frames based on the start of frame delimiter and the end of frame delimiter, it is inconsequential how the slots 422–426 line up with the HDLC frame 408 itself. That is, the HDLC data inherently maintains its own byte alignment.

In fact, because an HDLC frame such as the frame 408 employs bit stuffing and unstuffing, maintaining byte alignment with the slots 422–426 is essentially impossible. Although the HDLC frame 408 is shown containing an integral number of bytes of data, (assuming the information field 416 contains an integral number of bytes of data), bits are added to the frame before physical transmission by bit stuffing logic. So, while the logical frame 408 may have an integral number of bytes, the resulting physical frame transmitted would not. A second frame 428 is shown with two slots 430 and 432 that are actually byte aligned, but again, this is simply inconsequential. How the data from the HDLC frame 408 falls within slot 1 of the T1 frames 400 is irrelevant.

But the HDLC channels 164 can be employed in a transparent mode, in which no bit stuffing and no bit unstuffing occurs, there are no start of frame delimiters such as frame headers, information fields, frame check sequences, or end of frame delimiters. In fact, raw data is transmitted. Although this is not technically a "HDLC frame", in this transparent mode the HDLC channels 164 are effectively employed more generically as raw synchronous serial transmitters and receivers. One way to maintain byte alignment in such a system is to employ character matching, with framing characters being periodically inserted into the data stream. This, however, takes time to establish frame alignment, and is not foolproof.

Illustrated is a raw data stream 434. This data stream consists of a series of 8-bit data values. An example of such data values would be the transmission of raw digitized voice data transmitted over a channel of the T1 frames 400. In this case, misalignment of byte boundaries, illustrated by two time slots 438 and 440 associated with a second data stream 436, can be fatal. This would result in garbled data and improper conversion back to the voice data which was originally provided.

According to the invention, however, byte alignment of the raw data illustrated by the data streams 434 and 436 is maintained within the slots of a time division multiplexed (TDM) bus frame, such as the T1 frame 400. To summarize, when data is to first be transmitted or received by one of the HDLC channels 164, the HDLC channel, such as the HDLCA channel 200, is reset by the software. This reset internally resets the HDLCA channel 200, including resetting bit counters associated with shift registers and various state machines. Once the HDLCA channel 200 is reset, the next bit to be sent or received will be aligned on a byte or word boundary. Once the reset is released, byte aligned data within a FIFO of the HDLCA channel 200 is only transmitted (or received) on a next rising edge of an HDLCA channel 200 clock enable from the TSAA 208. If the reset signal to the HDLCA channel 200 is released while the TSAA 208 is providing a clock enable as true to the HDLCA channel 200, the HDLCA channel 200 waits until the TSAA 208 has deasserted the clock enable to the HDLCA channel 200 and then reasserted the clock enable again. Thus, when the clock enable is again asserted, the data that is transmitted by the HDLCA channel 200 will be ensured to byte aligned.

Further, the HDLCA channel 200, when it is transmitting, "preloads" output data into its output buffer before the TSAA 208 enables the clock enable to the HDLCA channel 200. Because the data must be both loaded into a shift register and through multiple flip flops before it is ready, this "pre-loading" ensures that when the TSAA 208 asserts the clock enable to the HDLCA channel 200, the first byte aligned bit of data will be available for transmission within the time slot defined for the TSAA 208.

Figure 6:
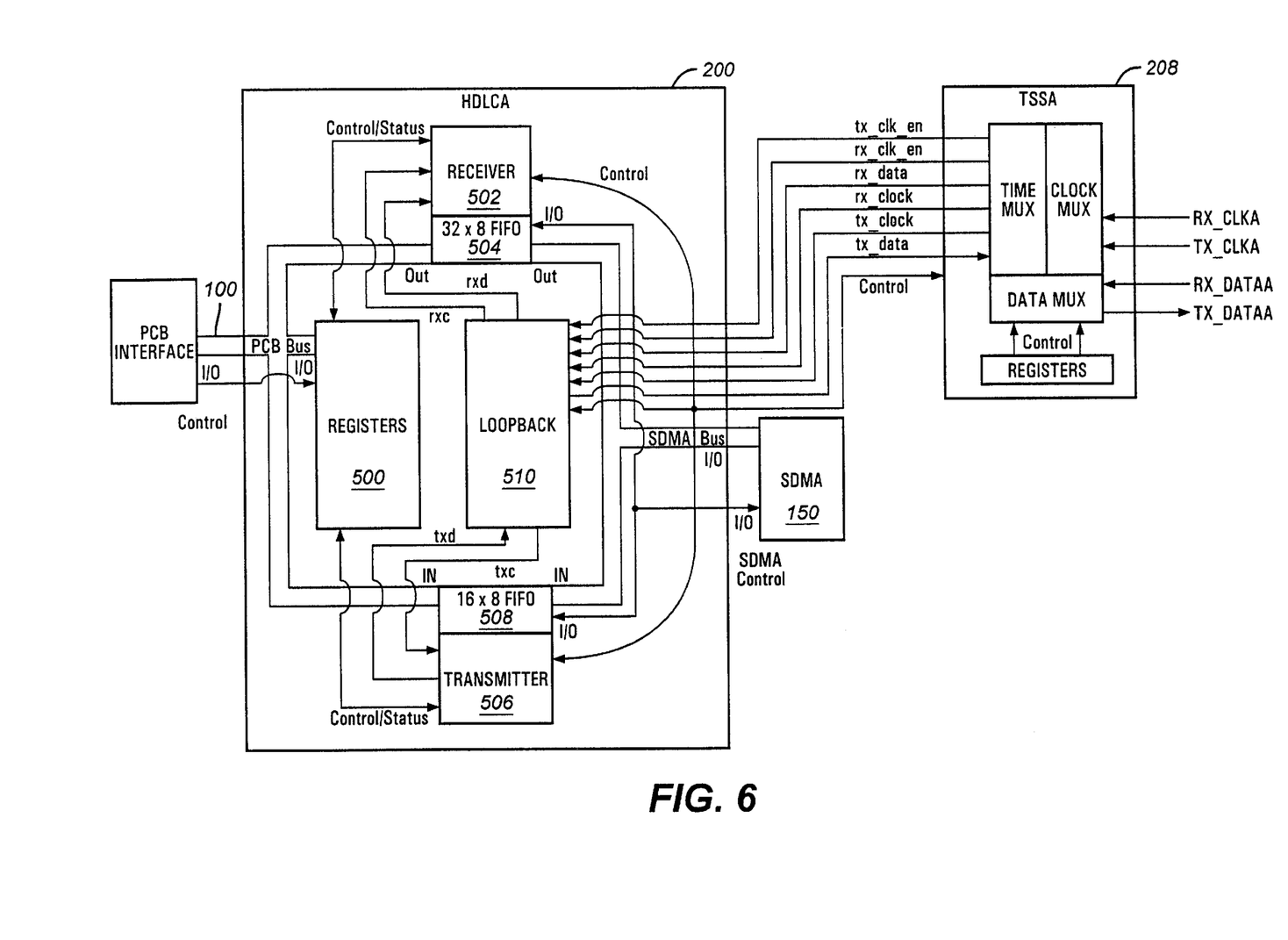
FIG. 6 is a block diagram of the internal components of the time slot assigner and associated HDLC channel.

Turning to FIG. 6, illustrated is a block diagram of one of the HDLC channels, HDLCA channel 200, and one of the TSA channels, TSAA 208, illustrating the basic blocks of operation within those devices. The HDLCA channel 200 includes an interface to the internal bus 100, through which the execution unit 124 can read from and write to registers 500 within the HDLCA channel 200. The HDLCA channel 200 further includes a receiver 502 with an associated FIFO 504, and a transmitter 506 with an associated FIFO 508. The receiver 502 and the transmitter 506 receive data from and transmit data to the TSAA 208 via a loopback control module 510. The HDLCA channel 200 is also coupled to the SmartDMA unit 150 for high speed data transfer.

An understanding of the operation of the HDLCA channel 200 in conjunction with the TSAA 208 is better understood if one considers the HDLCA channel 200 in operation without an associated TSAA 208. In that case, the transmitter 506 and the receiver 502 would continuously receive their transmit and receive clocks TXC and RXC and the corresponding clock enable would be continuously enabled as long as the HDLCA channel 200 was enabled. As previously discussed, however, the TSAA 208 turns on the transmit and receive clocks (via clock enables) of the HDLCA channel 200 when a time division multiplexed frame on the external interface A 226 is in the appropriate, assigned slot for the HDLCA channel 200. The TSAA 208 does so by enabling the transmit and receive clock enables for the HDLCA channel 200 via a transmit clock enable signal TX_CLK_EN and a receive clock enable signal RX_CLK_EN.

Figure 7:
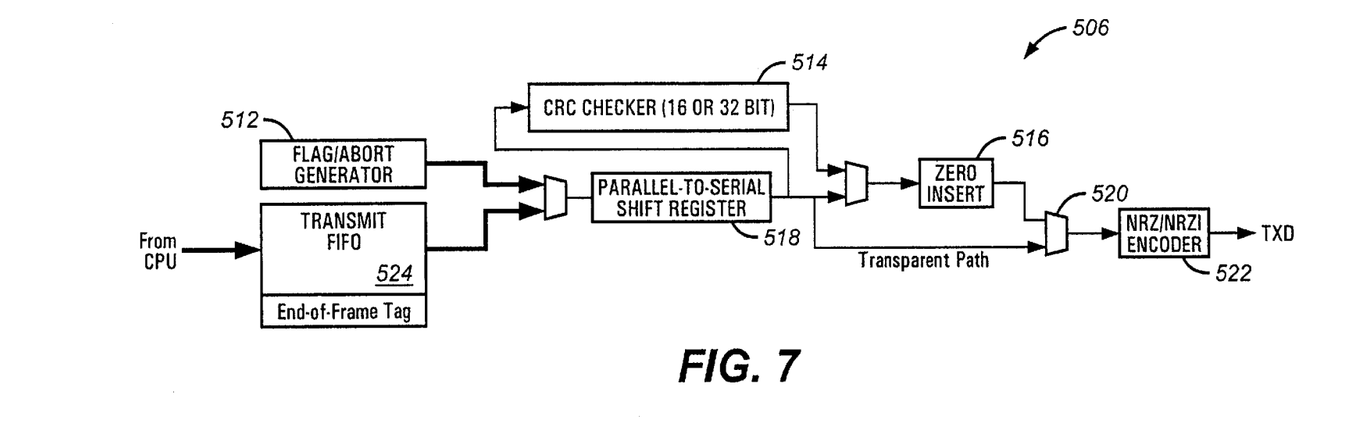
FIG. 7 is a block diagram of the internal components of the transmitter and the HDLC channel of FIG. 6.
Figure 8:
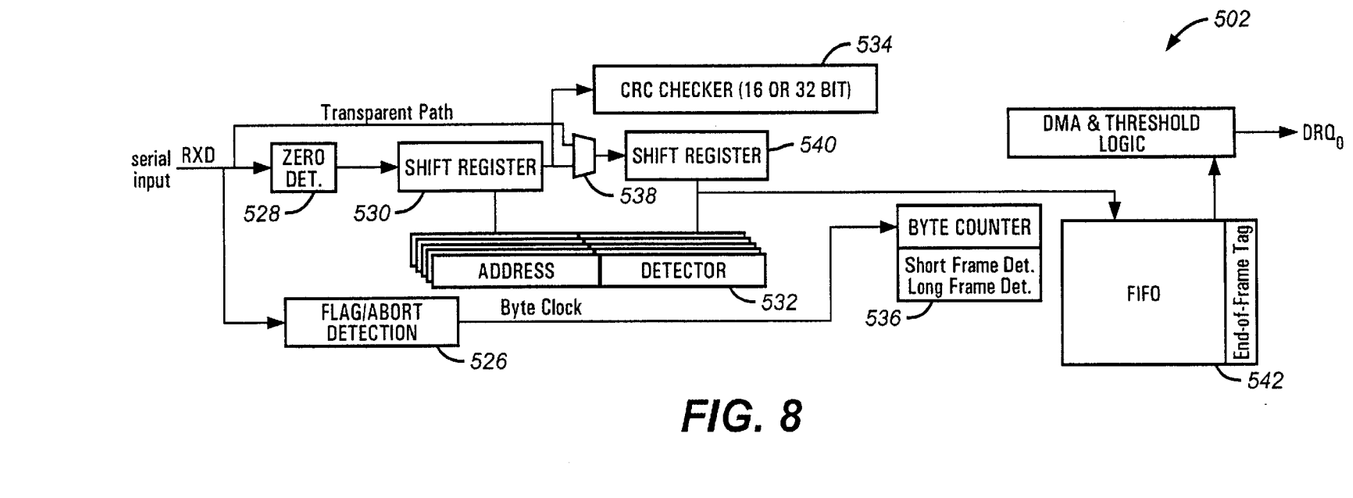
FIG. 8 is a block diagram of the internal components of the receiver of the HDLC channel of FIG. 6.

Turning to FIGS. 7 and 8, illustrated are further details of the transmitter 506 and the receiver 502. The transmitter includes a flag/abort generator 512, a CRC generator 514, and zero insertion logic 516, but none of these are employed in transparent mode, where a transparent path is taken from a parallel to serial shift register 518 through a multiplexer 520, through a non-return to zero encoder 522 and on as transmit data TXD. The data is received from a transmit FIFO 524, which when clear and loaded, contains byte aligned data.

Similarly, the receiver 502 includes a serial receive data input RXD, flag/abort detection logic 526, zero deletion depletion logic 528, a first shift register 530, an address detector 532, a CRC checker 534, and a byte counter 536, but none of these are used in transparent mode. Instead the serial data RXD is provided through a multiplexer 538 to a shift register 540, and then on to a FIFO 542.

According to the invention, however, the TSA 166 and the HDLC channel 164 associated with the transmitter 506 and the receiver 502 forces byte alignment of data with the start of a time division multiplexed slot, such as slot 1 of the T1 frame 400. It does so by resetting all of the circuitry within the receiver 502 and the transmitter 506 on an HDLCA channel 200 reset. As previously discussed, the reset of the HDLCA channel 200 resets the internal state machines and shift registers of the HDLCA channel 200. From this state, the next transmitted or received bit would fall on a byte boundary. The HDLCA channel 200 then activates the receiver 502 or transmitter 506 when the TSAA 208 next enables the transmit clock and the receive clock enables TX_CLK_EN and RX_CLK_EN. The transmitter 506 and the receiver 502 are not activated in the middle of the TDM slot while the transmit and receive clock enables TX_CLK_EN and RX_CLK_EN are true, but will only do so on the rising edge of those clock enable.

Further, the transmitter 506 includes circuitry, discussed below, that preloads data from the FIFO 524, through the shift register 510, and through the NRZ encoder 522 to be available for immediate transmission once the transmit clock TX_CLK_EN is next activated by the TSAA 208.

Figure 9:
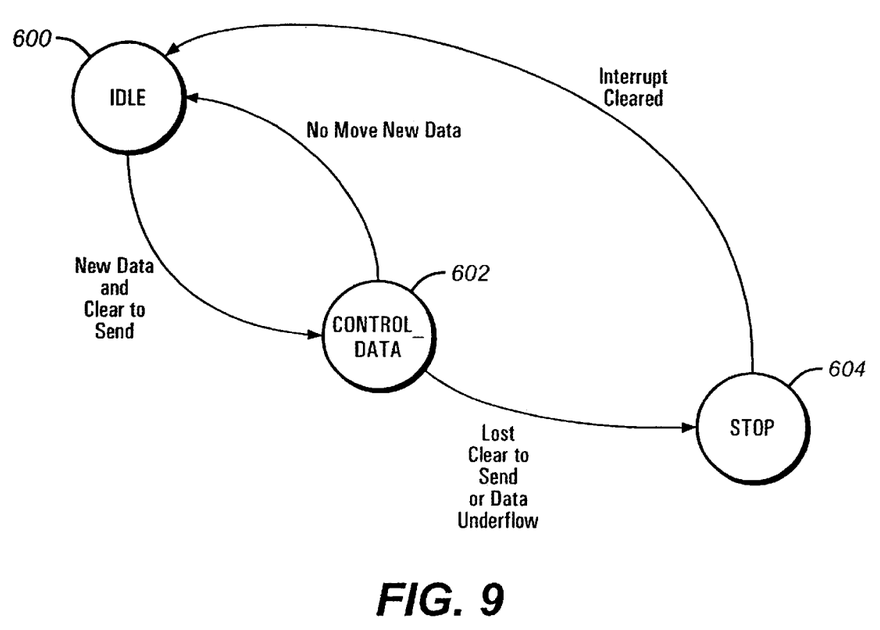
FIG. 9 is a simplified timing diagram of a state machine operated by the transmitter of FIG. 7 when the HDLC channel of FIG. 6 is in a transparent, raw data mode.

Turning to FIG. 9, illustrated is a state diagram implemented in the transmitter 506, but simplified to illustrate operation in transparent mode. In transparent mode, when no data is available for transmission, the state machine remains in an idle state 600. Once data becomes available and is placed in the output buffer ready for transmission, the state machine transitions to an output data state 602. It remains in this state until no more data is available for transmission, where it returns to the idle state 600. If errors occur during transmission, control proceeds from the output data state 602 to a stop state 604. Once the error is cleared, control returns to the idle state 600.

Circuitry illustrated below in FIGS. 10 through 12 employs the output data state 602 to preload the transmit data after a reset of the HDLCA channel 200 and before the TSAA 208 enables the transmitter 506 via TX_CLK_EN.

Figure 10:
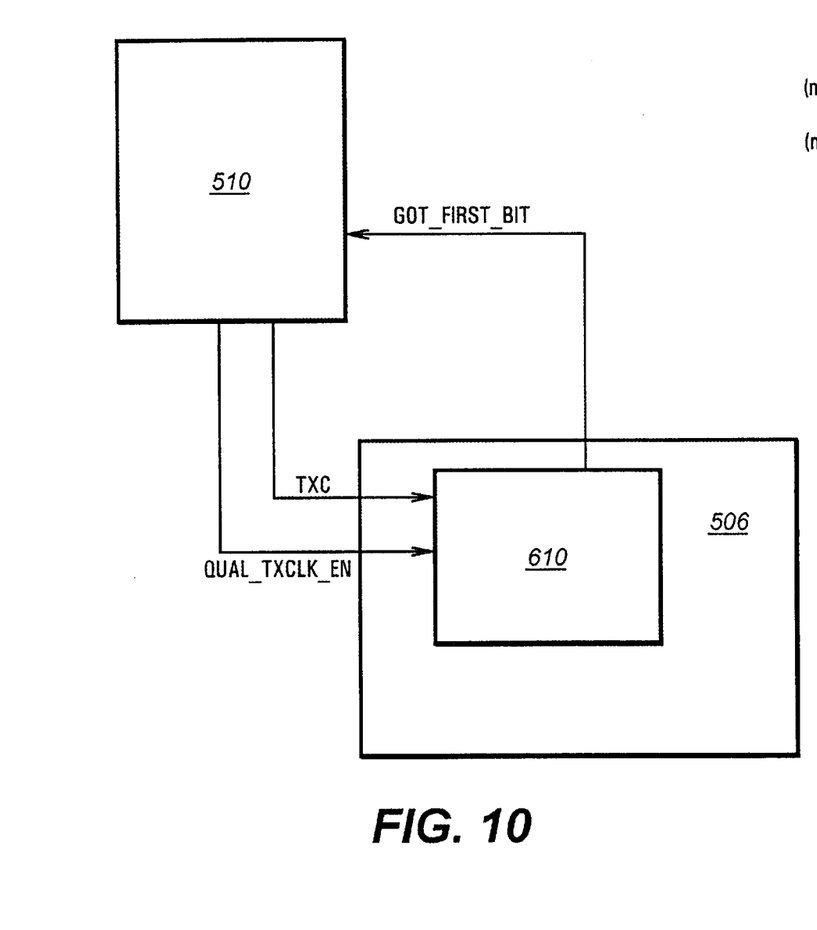
FIG. 10 is a simplified block diagram of specific components of the transmitter within the HDLC controller of FIG. 6.

Turning to FIG. 10, illustrated is a further block diagram of the loopback module 510 and the transmitter 506. A bit control module 610 within the transmitter 506 receives the transmit clock TXC from the loop back module 510, and also receives a qualified transmit clock enable signal QUAL_TXCLK_EN. The qualified transmit clock enable signal QUAL_TXCLK_EN serves to clock the bit control module 610, which contains the state machine of FIG. 9, until data is preloaded for transmission when the TSAA 208 again asserts the TX_CLK_EN signal on the start of the appropriate TDM time slot. That is, the loopback module 510 for a short period of time enables the transmit clock via QUAL_TXCLK_EN even though the TSAA 208 has deasserted the TX_CLK_EN signal. The loop back module 510 does so until the bit control module 610 indicates it has the first bit available in its output buffer ready for transmission, indicated by a signal GOT_FIRST_BIT, which is provided to the loopback module 510.

Figure 11:
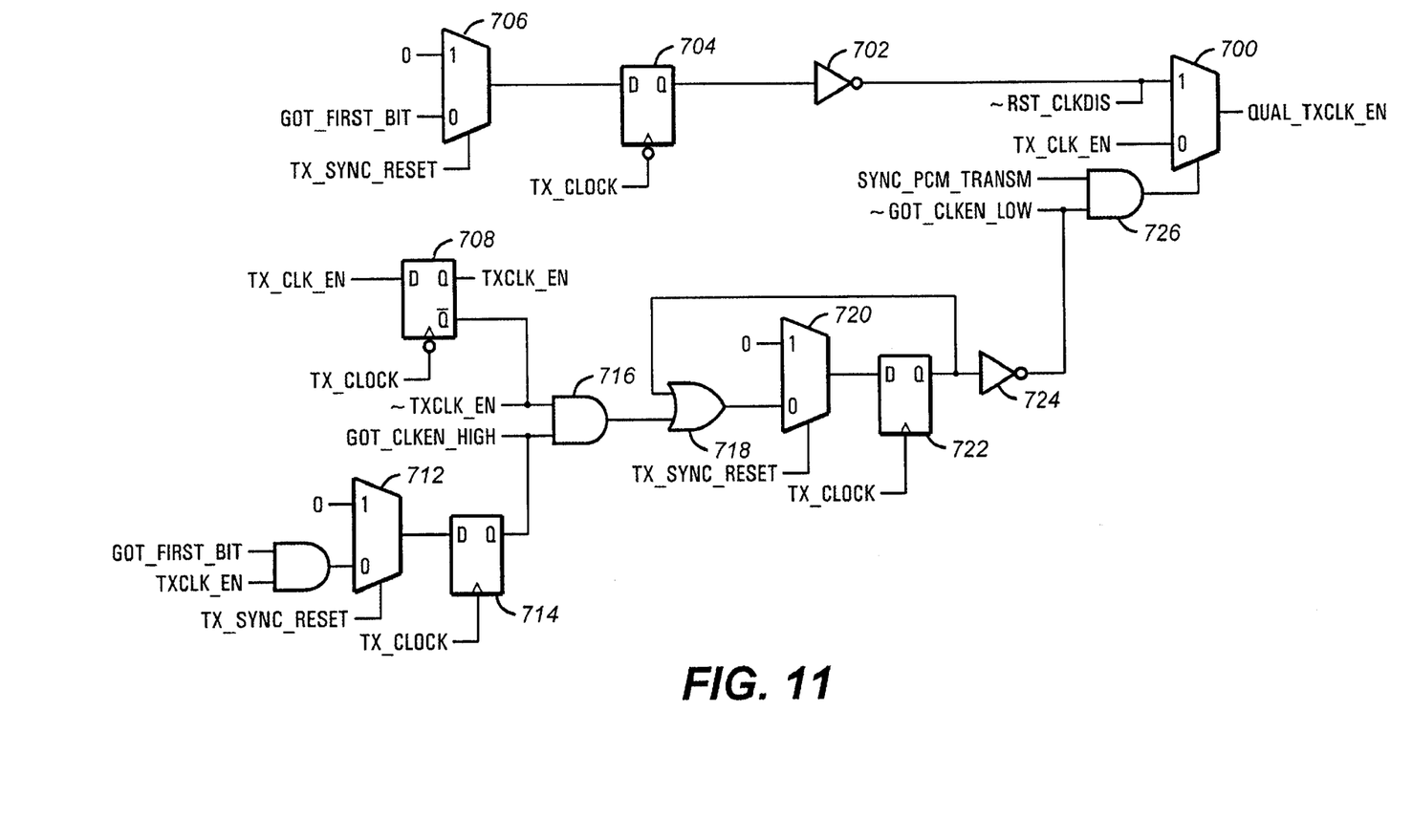
FIG. 11 is a schematic illustration of circuitry to generate a qualified transmit clock enable signal for the transmit circuitry of FIG. 10.

Turning to FIG. 11, illustrated is circuitry implemented within the loop back module 510 that provides the QUAL_

TXCLK_EN signal to the bit control module 610 of the transmitter 506. Before turning to the details of the circuitry of FIG. 11, an overview is helpful. During normal operation, the QUAL_TXCLK_EN signal is simply transmitted as the TX_CLK_EN signal received from the TSAA 208. During these periods, the bit control block 610 clocks data out to the loopback module 510 over the TXD signal responsive to the input transmitter clock signal TXC. That data is passed by the loopback module 510 to the TSAA 208 as the TX_DATA signal, which is in turn transmitted as TX_DATAA.

To byte align raw data, however, the software run on the execution unit 124 should first reset the HDLCA channel 200, here illustrated by a signal TX_SYNC_RESET. The TX_SYNC_RESET signal preferably reflects the setting of a reset bit among the registers 500 by software run on the execution unit 124. This signal essentially resets the transmitter 506 and the FIFO 508 illustrated in FIG. 6. Once that signal is released, however, the data has not yet been propagated into the shift register 510 or through the NRZ encoder 522, so the QUAL_TXCLK_EN signal is held high, allowing the transmitter 506 to "run" until the first bit is available for transmission over the TXD line. The occurrence of this preloaded condition is indicated by the GOT_FIRST_BIT signal, which is provided by the bit control circuitry 610 illustrated in FIG. 10.

But even once the transmitter 506 is preloaded, or correspondingly the receiver 502 is reset and ready to receive, the transmitter 506 (or the receiver 502) should not be started in the middle of the assigned TDM frame time slot. Instead, after the transmitter 506 is reset and preloaded, or after the receiver 502 is reset, the circuitry of FIG. 11 and FIG. 12 holds the QUAL_TXCLK_EN signal low until the next rising edge of the TX_CLK_EN signal from the TSAA 208. That is, the circuitry of FIGS. 11 and 12 holds off providing the clock enable true to the bit control circuitry 610 of the transmitter 506 until the start of the next assigned TDM frame time slot, where that start of slot is indicated by TX_CLK_EN or RX_CLK_EN going true.

Turning to FIG. 11, the QUAL_TXCLK_EN signal is provided as the output of a multiplexer 700. After the transmitter 506 is reset, the QUAL_TXCLK_EN signal is provided from the 1 input of the multiplexer 700. This input is in turn provided as an inverted reset clock disable signal, ~RST_CLKDIS, which is provided by the output of an inverter 702 driven by the Q output of a flip flop 704. The D input to the flip flop 704 is clocked to the Q output on the falling edge of TX_CLOCK, and the D input is provided by the output of a multiplexer 706. When TX_SYNC_RESET is high, 0 is provided as the output of the multiplexer 706. When TX_SYNC_RESET goes low, the GOT_FIRST_BIT signal is provided as the output. So, after TX_SYNC_RESET goes low, the GOT_FIRST_BIT signal will be low until the transmitter 506 has "preloaded" its data. Thus QUAL_TXCLK_EN will be high, until GOT_FIRST_BIT goes high, thus taking QUAL_TXCLK_EN low. Thus, the QUAL_TXCLK_EN signal will be driven high for an appropriate period to preload the buffers of the transmitter 506.

But further, if the QUAL_TXCLK_EN signal is then driven high simply in response to TX_CLK_EN signal being high, that could cause the HDLCA channel 200 to begin transmitting in the middle of its time slot on the TDM bus. Therefore, additional circuitry is provided that only allows QUAL_TXCLK_EN to begin tracking TX_CLK_EN not only after the first bit has been loaded as indicated by GOT_FIRST_BIT, but then on a low to high transition of TX_CLK_EN. This prevents the transmission from beginning in the middle of a slot.

To accomplish this, the TX_CLK_EN signal is first synchronized by a flip flop 708, which is clocked on the negative edge of TX_CLOCK and provides as its output a TXCLK_EN signal. This signal, along with the GOT_FIRST_BIT signal, are provided as inputs to an AND gate 710, which in turn is provided as the 0 input of a multiplexer 712. The multiplexer 712 is switched by the TX_SYNC_RESET signal, and provides a 0 out until the TX_SYNC_RESET signal goes low, at which point the output of the AND gate 710 is provided as the output of the multiplexer 712. This output is in turn synchronized by a flip flop 714, clocked by TX_CLOCK, which provides it as its output a GOT_CLKEN_HIGH signal. This signal is provided to an AND gate 716, which also receives the inverted TXCLK_EN signal. The output of the AND gate 716 is provided as one input to an OR gate 718, which is provided as the 0 input to a multiplexer 720, again which is switched by the TX_SYNC_RESET signal. The output of the multiplexer 720 is provided as the D input of a flip flop 722, which is clocked by the TX_CLOCK signal. The synchronized Q output of the flip flop 722 is provided both as a second input to the OR gate 718 and, after inversion by an inverter 724, as an input to an AND gate 726. The other input to the AND gate 726 is a SYNC_PCM_TRANSM signal, which when true indicates that this HDLCA channel 200 is operating in transparent mode. The output of the AND gate 726 is used to switch the multiplexer 700.

Turning to the operation of this portion of FIG. 11, the TX_SYNC_RESET signal when high forces a 0 out of the multiplexer 720. This in turn results in a 0 input to the OR gate 718. The other input to the OR gate 718 was similarly 0, because TX_SYNC_RESET being high forced the output of the multiplexer 712 to 0 as well. Thus, while in the reset mode, assuming operation of the transparent mode, both inputs to the AND gate 726 are high, switching the multiplexer 700 to its 1 input. When TX_SYNC_RESET is taken low after the reset, the QUAL_TXCLK_EN signal is still provided by the 1 input of the mutliplexor 700, which as previously discussed remains high until the GOT_FIRST_BIT signal is true at the multiplexer 706. Therefore, the QUAL_TXCLK_EN signal remains high, causing the receiver 506 to preload its data, until the GOT_FIRST_BIT signal from the bit control logic 610 of the receiver 506 is true.

While the GOT_FIRST_BIT signal is false, the output of the AND gate 710, and thus the output of the AND gate 716 remain low, and ultimately the multiplexer 700 remains switched to its 1 input, with the QUAL_TXCLK_EN signal tracking the inverted GOT_FIRST_BIT signal.

When the GOT_FIRST_BIT signal goes true, the switching of the multiplexer 700 then becomes dependent on the TX_CLK_EN signal. The synchronized signal TXCLK_EN, when it goes true, causes the output of the AND gate 710 to go true. This is then synchronized to the positive edge of TX_CLOCK by the flip flop 714. So the GOT_CLKEN_HIGH signal remains true until TX_CLK_EN goes low, as synchronized by the falling edge of TX_CLOCK by the flip flop 708. At that point, both inputs to the AND gate 716 go true for one pulse, forcing the OR gate 718 output true, which is clocked by TX_CLOCK by the flip flop 722 on the next rising edge. This causes the output of the AND gate 726 to go low, forcing the multiplexer 700 to the 0 input, such that QUAL_TXCLK_EN then tracks TX_CLK_EN. But because TX_CLK_EN signal went false to switch the multiplexer 700, the QUAL_

TXCLK_EN signal will not enable the transmitter 506 until the next rising edge of TX_CLK_EN.

So, the output of the AND gate 726 effectively goes high, switching the QUAL_TXCLK_EN signal to track the TX_CLK_EN signal, on the first rising clock after TX_CLK_EN goes low. This ensures that the transmitter 506 will not begin transmitting in the middle of the TSAA 208 time slot. Note that because the Q output of the flip flop 722 is fed back into the OR gate 718, the QUAL_TXCLK_EN signal continues to track the TX_CLK_EN signal until the next transmitter reset by activation of the TX_SYNC_RESET signal.

Figure 12:
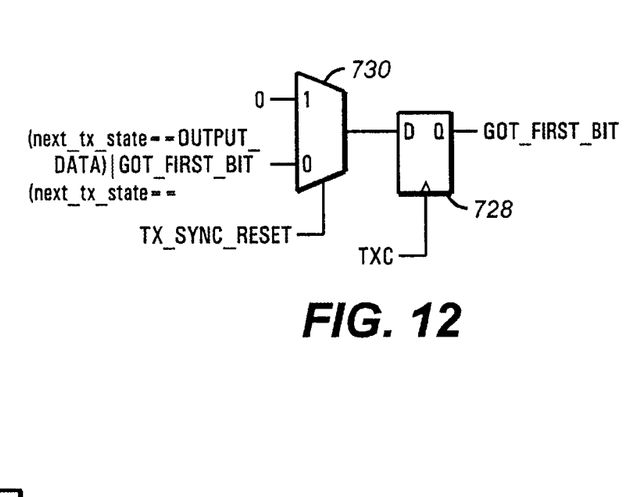
FIG. 12 is a schematic illustration of circuitry to indicate to clock generation circuitry of FIG. 10 that a first bit is ready for output by the transmit circuitry of FIG. 10.

Turning to FIG. 12, illustrated as the circuitry that provides the GOT_FIRST_BIT signal from the bit control circuit 610 to the loopback block 510. This signal is simply provided as an output of a synchronizing flip flop 728, which is clocked by the transmitter clock TXC, which in turn receives as its input the output of a multiplexer 730. The multiplexer is switched by the TX_SYNC_RESET signal, which when true forces a 0 out of the mutliplexor 730. When TX_SYNC_RESET signal goes low, the output of the multiplexer 730 is true when the next state of the state machine of FIG. 9, indicated by NEXT_TX_STATE, is equal to the output data state, indicated by OUTPUT_DATA or when GOT_FIRST_BIT is already true. This event becomes true when a bit is available as output data from the output flip flops of the bit control logic 610 within the transmitter 506. Thus, the bit control logic 610 of the transmitter 506 informs the loopback block 510 when it has a first bit available for transmission. At that time, the loopback block 510 disables the transmitter 506 clock until the start of the next assigned TDM frame time clock, indicated by the TX_CLK_EN signal going through from the TSAA 208.

The receiver 502 is similarly configured, but requires less complicated logic than that of FIG. 11. This is because the receiver need not pre-clock data into its output buffers after it has been reset. Instead, the receiver requires that the receive clock not be enabled in the middle of a time slot but instead at the beginning of the time slot as indicated by the rising edge of the RX_CLK_EN signal from the TSAA 208.

It will be appreciated that serial interfaces other than an HDLC controller could be employed in conjunction with a TSA and byte align raw data in a similar manner. Similarly, other lengths of data could be aligned with a time slot specified by a TSA. For example, if the time slot was 16 bits long, the data could be byte aligned or word aligned. If the slot was 7 bits long, 7-bit data could be aligned with the starting edge of the TSA. On the receive end, it would be ensured that the received data was aligned with the time slot.

The foregoing disclosure and description of the invention are illustrative and explanatory thereof, and various changes in the details of the illustrated apparatus and construction and method of operation may be made without departing from the spirit of the invention.

We claim:

1. A microcontroller implemented as a single monolithic integrated circuit for communicating over a time division multiplexed (TDM) bus, comprising:
    an execution unit for executing instructions;
    a synchronous serial communications channel that communicates serial data responsive to a control signal;
    a time slot assigner for coupling the synchronous serial communications channel to the TDM bus, the time slot assigner including a start of time slot bit value and an end of time slot bit value, the time slot assigner providing the control signal at an enabling level when a frame of the TDM bus reaches the start of time slot bit value and providing the control signal at a disabling value when the frame of the TDM bus reaches the end of time slot bit value.

2. The microcontroller of claim 1, wherein the start of time slot bit value and the end of time slot bit value are held in registers writable by the execution unit.

3. The microcontroller of claim 2, wherein when the start of time slot bit value is greater than the end of time slot bit value, the time slot assigner provides the control signal at an enabling value across multiple TDM bus frames.

4. The microcontroller of claim 2, wherein the start of time slot bit value and the end of time slot bit value are assigned a number of bits large enough to contain the value of any bit position within a TDM bus frame.

5. The microcontroller of claim 4, wherein the start of time slot bit value and the end of time slot bit value registers are 12 bits.

6. The microcontroller of claim 1, the time slot assigner further including an end of slot adjust value, wherein the time slot assigner drives the TDM bus to a predetermined level after the end of slot value is reached for a number of bits equal to the end of slot adjust value.

7. The microcontroller of claim 1, further comprising:
    a plurality of additional synchronous serial communications channels responsive to additional control signals;
    a plurality of additional time slot assigners coupled to corresponding ones of the additional synchronous serial communications channel, the additional slot assigners each having additional start of time slot bit values and end of time slot bit values.

8. The microcontroller of claim 7, wherein the plurality of additional time slot assigners are for coupling the additional synchronous serial communications channels to the TDM bus.

9. The microcontroller of claim 1, wherein the synchronous serial communication channel is an HDLC channel.

10. The microcontroller of claim 1, wherein the time slot assigner is configurable couples the synchronous serial communication channel to a T1 protocol bus.

11. The microcontroller of claim 1, wherein the time slot assigner is configurable to couple the synchronous serial communication channel to a GCI bus.

12. The microcontroller of claim 1, wherein the time slot assigner includes a frame bit counter that is reset on a start of frame, the frame bit counter coupled to comparators that compare the frame counter to the start of time slot bit value and the end of time slot bit value.

13. A communications system for communicating over a time division multiplexed (TDM) bus, comprising:
    a synchronous serial communications channel that communicates serial data responsive to a control signal;
    a time slot assigner for coupling the synchronous serial communications channel to the TDM bus, the time slot assigner including a start of time slot bit value and an end of time slot bit value, the time slot assigner providing the control signal at an enabling level when a frame of the TDM bus reaches the start of time slot bit value and providing the control signal at a disabling value when the frame of the TDM bus reaches the end of time slot bit value.

14. The communications system of claim 13, wherein the start of time slot bit value and the end of time slot bit value are held in registers writable by the execution unit.

15. The communications system of claim 13, wherein when the start of time slot bit value is greater than the end of time slot bit value, the time slot assigner provides the control signal at an enabling value across multiple TDM bus frames.

16. The communications system of claim 13, wherein the start of time slot bit value and the end of time slot bit value are assigned a number of bits large enough to contain the value of any bit position within a TDM bus frame.

17. The communications system of claim 13, wherein the start of time slot bit value and the end of time slot bit value registers are 12 bits.

18. The communications system of claim 13, the time slot assigner further including an end of slot adjust value, wherein the time slot assigner drives the TDM bus to a predetermined level after the end of slot value is reached for a number of bits equal to the end of slot adjust value.

19. The communications system of claim 13, further comprising:
   a plurality of additional synchronous serial communications channels responsive to additional control signals;
   a plurality of additional time slot assigners coupled to corresponding ones of the additional synchronous serial communications channel, the additional slot assigners each having additional start of time slot bit values and end of time slot bit values, and for coupling the additional synchronous serial communications channels to the same TDM bus.

20. The communications system of claim 13, wherein the plurality of additional time slot assigners are for coupling the additional synchronous serial communications channels to the same TDM bus.

21. The communications system of claim 13, wherein the synchronous serial communication channel is an HDLC channel.

22. The communications system of claim 13, wherein the time slot assigner is configurable to couple the synchronous serial communication channel to a T1 protocol bus.

23. The communications system of claim 13, wherein the time slot assigner is configurable to couple the synchronous serial communication channel to a GCI bus.

24. The communications system of claim 13, wherein the time slot assigner includes a frame bit counter that is reset on a start of frame, the frame bit counter coupled to comparators that compare the frame counter to the start of time slot bit value and the end of time slot bit value.

25. A method of communicating over a time division multiplexed bus (TDM) using a synchronous serial communication channel and a time slot assigner, comprising the steps of:
   coupling the synchronous serial communication channel to the time multiplexed bus with the time slot assigner;
   receiving a start of frame on the TDM bus by the time slot assigner;
   counting bit positions from the start of frame in the time slot assigner;
   enabling the communication channel when the bit position equals a start of slot bit position; and
   disabling the communication channel when the bit position equals an end of slot bit position.

26. The method of claim 25, further comprising the steps of:
   after the end of slot bit position is reached, the time slot assigner driving the bus to a predetermined value for a predetermined number of bit positions.

27. The method of claim 25, wherein the start and end of slot bit positions correspond to a D channel on an ISDN protocol carrying bus.

28. The method of claim 25, wherein the bit positions correspond to a B channel on an ISDN protocol carrying bus.

29. The method of claim 28, wherein the start and end of slot bit positions correspond to a subportion of the B channel on an ISDN protocol carrying bus for rate adaptation.

30. The method of claim 28, wherein the ISDN protocol carrying bus is a GCI bus.

* * * * *